(12) United States Patent
Watanabe

(10) Patent No.: US 7,941,787 B2
(45) Date of Patent: May 10, 2011

(54) PERFORMANCE TUNING METHOD AND APPARATUS, COMPUTER-READABLE PROGRAM AND COMPUTER-READABLE STORAGE MEDIUM

(75) Inventor: Manabu Watanabe, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1267 days.

(21) Appl. No.: 11/506,962

(22) Filed: Aug. 21, 2006

(65) Prior Publication Data

US 2007/0234299 A1 Oct. 4, 2007

(30) Foreign Application Priority Data

Mar. 2, 2006 (JP) ................................. 2006-056632

(51) Int. Cl.
G06F 9/44 (2006.01)
(52) U.S. Cl. ........ 717/124; 717/126; 717/127; 717/130; 717/131; 717/134
(58) Field of Classification Search .................... None
See application file for complete search history.

(56) References Cited

U.S. PATENT DOCUMENTS

| | | | | |
|---|---|---|---|---|
| 6,189,142 B1 * | 2/2001 | Johnston et al. | ............... | 717/125 |
| 6,728,949 B1 * | 4/2004 | Bryant et al. | ................. | 717/127 |
| 6,799,147 B1 * | 9/2004 | Balasubramanian et al. | | 702/186 |
| 7,240,244 B2 * | 7/2007 | Teegan et al. | ................... | 714/38 |
| 7,421,681 B2 * | 9/2008 | DeWitt et al. | ................. | 717/128 |
| 7,458,067 B1 * | 11/2008 | Tirumalai et al. | ............. | 717/140 |
| 7,559,053 B2 * | 7/2009 | Krassovsky et al. | .......... | 717/126 |
| 7,640,536 B1 * | 12/2009 | Whalen et al. | ................. | 717/126 |
| 2005/0060132 A1 * | 3/2005 | Hollander et al. | ............... | 703/14 |
| 2005/0081019 A1 * | 4/2005 | DeWitt et al. | ................. | 712/227 |
| 2005/0144267 A1 * | 6/2005 | Maron | .......................... | 709/223 |
| 2005/0155019 A1 * | 7/2005 | Levine et al. | ................... | 717/127 |
| 2005/0155021 A1 * | 7/2005 | DeWitt et al. | ................. | 717/130 |
| 2006/0101416 A1 * | 5/2006 | Callahan et al. | .............. | 717/128 |
| 2006/0230391 A1 * | 10/2006 | Alexander et al. | ............ | 717/130 |
| 2007/0220492 A1 * | 9/2007 | Brugiolo et al. | .............. | 717/126 |

OTHER PUBLICATIONS

Author: Hong-Linh Truong, Title: Dynamic Instrumentation, Performance Monitering and Analysis of Grid Scientific Workflow, Date: Spring 2005, publisher: Journal of Grid Computing pp. 1-18.*

(Continued)

*Primary Examiner* — Thuy Dao
*Assistant Examiner* — Ziaul Chowdhury
(74) *Attorney, Agent, or Firm* — Fujitsu Patent Center

(57) ABSTRACT

A performance tuning method tune a running performance of a program, by managing a measuring condition that is set when the running performance of the program was measured under an arbitrary measuring environment and performance information of the program acquired as a result of the measurement, in a linkable manner with respect to candidates of a measuring environment of the next measurement that is different from the arbitrary measuring environment, automatically setting the measuring condition to be used to measure the running performance of the program using a measuring environment that is different from the arbitrary measuring environment, based on the information that is managed in the linkable manner, and tuning the running performance of the program depending on the performance information.

15 Claims, 15 Drawing Sheets

OTHER PUBLICATIONS

Author: B. Norris, Title: Performance Monitoring and Analysis Components in Adaptive PDE-Bases Simulation, Date Mar. 4th, 2005, Publisher: Department of Computer Science and Engineering, The Pennsylvania State University, pp. 1-23.*

"Dynamic Code Management:Improving Whole Program Code Locality in Managed Runtimes", Xianglong Huang, Jun. 2006, pp. 1-11, <http://delivery.acm.org/10.1145/1140000/1134779/p133-huang.pdf>.*

"A Grafics Facility Useful for Performance Monitoring on an NCUBE", Dave Toll, Jan. 1998, pp. 1-6, <http://delivery.acm.org/10.1145/70000/62396/p766-tolle.pdf>.*

"Dynamic Program Instrumentation for Scalable Performance Tool", Jeffrey K. Hollingsworth et al., 1994, pp. 1-10, <http://ieeexplore.ieee.org/stamp/stamp.jsp?arnumber=00296728>.*

* cited by examiner

| FUNCTION NAME | CALL NO. | OCCUPIED RATIO |
|---:|---:|---:|
| func11() | 11 Times | 82% |
| func12() | 8 Times | 16% |
| func13() | 4 Times | 1% |
| func14() | 3 Times | 1% |

FIG.10

| PERFORMANCE INDEX | |
|---|---|
| ILP (Instruction Level Parallelism) | 1.56 |
| I$-Miss | 23 Times |
| D$-Miss | 21 Times |
| Performance Index | 4 Times |

FIG.14

| SET CONDITION |
|---|
| OCCUPIED RATIO OF [80%] OR GREATER —— OCCUPIED RATIO CONDITION OF FUNCTION |
| ◉ PA   ○ PROFILER —— NEXT MEASURING ENVIRONMENT |

FIG.15

| SET CONDITION: NEXT PA/OCCUPIED RATIO OF 80% OR GREATER ||||
|---|---|---|---|
| TOOL | START | END | NEXT |
| PA | _start_PA | _end_PA | O |
| sampler | _start_sampler | _end_sampler | |
| Profiler | _start_profiler | _end_profiler | |

FIG.16

| FUNCTION NAME | CALL NO. | OCCUPIED RATIO | CONTROL INFO OF PA MEASUREMENT | PA MEASUREMENT |
|---|---|---|---|---|
| func11() | 11 Times | 82% | test1.c line 12_pa_start: | ○ |
| func12() | 8 Times | 16% | test1.c line 23 | × |
| func13() | 4 Times | 1% | test1.c line 34 | × |
| func14() | 3 Times | 1% | test1.c line 45 | × |

← MEASUREMENT START & END INFO OF PA MEASUREMENT

← PA MEASURING TARGET

FIG.18

| FUNCTION NAME | CALL NO. | OCCUPIED RATIO | CONTROL INFO FOR PA MEASUREMENT | PA MEASUREMENT | MEASURING INFO OF PROFILER | PROFILER MEASUREMENT |
|---|---|---|---|---|---|---|
| func11() | 11 Times | 82% | test1.c line 12 pa_start<br>test1.c line 23 pa_end | FUNCTION | test1.c 0x1234 set profier start<br>test1.c 0x1260 set profier end<br>test1.c 0x1290 set profier start<br>test1.c 0x12A0 set profier end | LOOP |
| func12() | 8 Times | 16% | | NONE | test1.c 0x2345 set profier start<br>test1.c 0x2350 set profier end<br>test1.c 0x2410 set profier start<br>test1.c 0x2420 set profier end | LOOP |

FIG.19

```
SETTING CONDITION (SAMPLER FOR PROFILER)

CALL NO. OF [8 TIMES] OR          REFERENCE
                    GREATER       CONDITION

◉ PROFILER

MEASURING POSITION
    ○ FUNCTION    ◉ LOOP
    ◉ RANGE SETTING

EMBEDDED DESCRIPTION
    [ # pragma loop unroll ]
```

FIG.20

| FUNCTION NAME | CALL NO. | OCCUPIED RATIO | CONTROL INFO OF PA MEASUREMENT | PA MEASUREMENT | MEASURING INFO OF PROFILER | PROFILER MEASUREMENT | OPTIMIZING INSERTION COMMAND |
|---|---|---|---|---|---|---|---|
| func11() | 11 Times | 82% | test1.c line 12 pa_start<br>test1.c line 23 pa_end | FUNCTION | test1.c 0x1234 set profier start<br>test1.c 0x1260 set profier end<br>test1.c 0x1290 set profier start<br>test1.c 0x12A0 set profier end | LOOP | #pragma loop unrool<br><br>#pragma inline |
| func12() | 8 Times | 16% | | NONE | test1.c 0x2345 set profier start<br>test1.c 0x2350 set profier end<br>test1.c 0x2410 set profier start<br>test1.c 0x2420 set profier end | LOOP | #pragma xxx |

PERFORMANCE TUNING METHOD AND APPARATUS, COMPUTER-READABLE PROGRAM AND COMPUTER-READABLE STORAGE MEDIUM

BACKGROUND OF THE INVENTION

1. Field of the Invention

The present invention generally relates to performance tuning methods and apparatus, program and storage media, and more particularly to a performance tuning method and a performance tuning apparatus for tuning the performance of a target program that is the measuring target using different running performance measuring methods, a computer-readable program for causing a computer to carry out a performance tuning using such a performance tuning method, and a computer-readable storage medium which stores such a computer-readable program.

2. Description of the Related Art

Generally, in a cross-development environment, the program is tuned by acquiring information related to the running performance via a simulator, emulator and the like. The methods of measuring the running performances of the programs differ in most cases depending on the running environments of the programs.

For example, the entire program is measured by the emulator, which is a sampler, and a target portion that is to be tuned is narrowed down from the occupied ratio and the number of references made for each function. In addition, more detailed information related to the running performance of the narrowed down target portion is acquired by a performance analyzer (PA) which is an emulator that displays the model operation state, a high-precision profiler which is a simulator, and the like, which are other than the sampler, so as to narrow down the tuning point. Accordingly, it is possible to effectively and efficiently tune the performance of the program.

The running environment of the sampler, the running environment of the performance analyzer and the running environment of the profiler exist independently of each other. For this reason, the running and control of the target program that is to be measured must be set with respect to each project.

FIG. 1 is a flow chart for explaining an example of a conventional performance tuning method. It is assumed for the sake of convenience that, as the measuring environment, the method of measuring the running performance of the program can select different samplers, profilers and performance analyzer depending on the running environment. The sampler, the profiler and the performance analyzer are tools for measuring the running performance of the program.

In FIG. 1, a step S1 selects a measuring environment for the running performance of the program. The process advances to a step S2-1 if the selected measuring environment is the sampler, advances to a step S2-2 if the selected measuring environment is the profiler, and advances to a step S2-3 if the selected measuring environment is the performance analyzer. Since the steps S2-2 through S7-2 and the steps S2-3 through S7-3 basically carry out processes similar to those of the steps S2-1 through S7-1, a description will be given of a case where the measuring environment that is selected first is the sampler and the measuring environment that is selected next is the performance analyzer.

The step S2-1 creates a project for measuring the running performance of the program, by the sampler. The step S3-1 is carried out if a measuring range (that is, the measuring environment) of the sampler is set in a source-embedded form, and sets the measuring range. The step S4-1 builds and loads the measuring target. The step S5-1 is carried out if the step S3-1 is not carried out, and sets the measuring range (that is, the measuring environment) of the sampler. The step S6-1 carries out a measurement by the sampler using the set measuring range. The step S7-1 acquires performance information of the program obtained as a result of the measurement, and the process advances to a step S8.

The step S8 decides whether or not the acquired performance information indicates a desired performance or higher and is sufficiently high. If the decision result in the step S8 is YES, a step S9 decides whether or not to tune the performance of the program. If the decision result in the step S9 is YES, a step S10 tunes the program based on an instruction from an operator (or user). If the decision result in the step S8 is NO or, after the step S10, a step S11 decides whether or not to measure the running performance of the program under another measuring condition, and the process returns to the step S1 if the decision result in the step S11 is YES. If the decision result in the step S9 or S11 is NO, the process ends.

FIGS. 2 through 5 are diagrams showing examples of display screens that are displayed on a display part of a computer system when executing steps S2-1, S3-1, S5-1 and S7-1.

In FIG. 2, "+Sampler.PRJ" indicates the project that is created in the step S2-1, and it is assumed that this project is registered in an integrated development environment (IDE). In addition, "–start_sampler.s" and "–sampler.lib" respectively indicate a measuring source and a library that are used by the measurement made by the sampler. Moreover, "–test1.c", "–test2.c" and "–test3.c" indicate user applications. In the integrated development environment, the sampler or performance analyzer or profiler is selected by a project control in the case described above, and the compiling, assembling and linking are carried out by a build control. Further, the running performance of the target program is measured and performance information of the target program is acquired by an emulator control, when the performance analyzer or profiler is selected. The running performance of the target program is measured and the performance information of the target program is acquired by the emulator control, when the profiler is selected.

In FIG. 3, a portion surrounded by bold lines indicate the measuring range of the sampler that is set in the source-embedded form in the step S3-1.

In FIG. 4, a portion surrounded by bold lines indicate the measuring range of the sampler that is set in a form other than the source-embedded form in the step S5-1. Particularly in the case of the profiler or the like, it may not be necessary to make a source-embedding such as "–start_sampler( )" by use of a tool. In such a case, a break may be made at a position indicated by "O" in FIG. 4, for example, and the sampler may be turned ON so as to measure the running performance of the program, and a break may be made at a next position indicated by "O", so as to set a part between the two breaks "O" as the measuring range in which the measurement is possible.

In the particular case shown in FIG. 5, the performance information of the program acquired in the step S7-1 includes a number of calls (or call number) and the occupied ratio with respect to each function name. From the performance information of the program shown FIG. 5, it is possible to specify a high-cost function, and the running performance of the program is measured under another measuring environment with respect to a high-cost function "func11( )", for example. It is assumed for the sake of convenience that the performance analyzer is selected as the measuring environment in the step S1 with respect to the high-cost function "func11( )".

FIGS. 6 through 10 are diagrams showing examples of display screens that are displayed on the display part of the computer system when executing the steps S2-3, S3-3, S5-3 and S7-3.

In FIG. 6, "+PA.PRJ" indicates a project that is created in the step S2-3, and "–start_pa.s" indicates a measuring source that is used for the measurement by the performance analyzer. In addition, "–test1.c", "–test2.c" and "test3.c" indicate user applications.

In FIG. 7, since the portion surrounded by the bold lines indicates the measuring range of the sampler that is set in the source-embedded form in the step S3-1, the step S3-3 first deletes this range. In FIG. 8, a portion surrounded by bold lines indicates a measuring range of the performance analyzer that is set in the source-embedded form in the step S3-3. In this particular case, an exclusive function is embedded in order to carry out the measurement by the performance analyzer with respect to the high-cost function "func11( )".

In FIG. 9, a portion surrounded by bold lines indicate a measuring range of the performance analyzer that is set in a form other than the source-embedded form in the step S5-3.

In the particular case shown in FIG. 10, the performance information of the program acquired in the step S7-3 is made up of performance indexes including instruction level parallelism (ILP), I$-Miss, D$-Miss and stall. Accordingly, it is possible to specify the performance indexes of the high-cost function "func11( )".

Therefore, according to the conventional performance tuning method, the operator must carry out a troublesome operation of setting the measuring range every time the running performance of the program is to be measured, such as when using a different measuring environment (that is, a different measuring method) and when carrying out the measurement that narrows down the measuring range.

In addition, although it is conceivable to use the setting information that has been set when the measurement was made by the sampler, for example, as the setting information for the measurement by the performance analyzer, there are cases where the measurement result by the sampler which makes the measurement first must be definite before the measuring range of the performance analyzer which makes the measurement next may be specified. Hence, the setting information that has been set for the measurement cannot be used as it is for the measurement using a different measuring method or a different measuring environment.

Therefore, there was a problem in that it is difficult to efficiently tune the performance of the program by the conventional performance tuning method.

SUMMARY OF THE INVENTION

Accordingly, it is a general object of the present invention to provide a novel and useful performance tuning method, performance tuning apparatus, computer-readable program and computer-readable storage medium, in which the problem described above are suppressed.

Another and more specific object of the present invention is to provide a performance tuning method, a performance tuning apparatus, a computer-readable program and a computer-readable storage medium, which can improve the efficiently with which the performance of a program may be tuned.

Still another object of the present invention is to provide a performance tuning method for tuning a running performance of a program, comprising a managing step managing a measuring condition that is set when the running performance of the program was measured under an arbitrary measuring environment and performance information of the program acquired as a result of the measurement, in a linkable manner with respect to candidates of a measuring environment of the next measurement that is different from the arbitrary measuring environment; a setting step automatically setting the measuring condition to be used to measure the running performance of the program using a measuring environment that is different from the arbitrary measuring environment, based on the information that is managed in the linkable manner; and a tuning step tuning the running performance of the program depending on the performance information. According to the performance tuning method of the present invention, it is possible to improve the efficiently with which the performance of the program may be tuned.

A further object of the present invention is to provide a computer-readable program which causes a computer to tune a running performance of a program, comprising a managing procedure causing the computer to manage a measuring condition that is set when the running performance of the program was measured under an arbitrary measuring environment and performance information of the program acquired as a result of the measurement, in a linkable manner with respect to candidates of a measuring environment of the next measurement that is different from the arbitrary measuring environment; a setting procedure causing the computer to automatically set the measuring condition to be used to measure the running performance of the program using a measuring environment that is different from the arbitrary measuring environment, based on the information that is managed in the linkable manner; and a tuning procedure causing the computer to tune the running performance of the program depending on the performance information. According to the computer-readable program of the present invention, it is possible to improve the efficiently with which the performance of the program may be tuned.

Another object of the present invention is to provide a computer-readable storage medium which stores the computer-readable program described above. According to the computer-readable storage medium of the present invention, it is possible to improve the efficiently with which the performance of the program may be tuned.

Still another object of the present invention is to provide a performance tuning apparatus for tuning a running performance of a program, comprising a managing part configured to manage a measuring condition that is set when the running performance of the program was measured under an arbitrary measuring environment and performance information of the program acquired as a result of the measurement, in a linkable manner with respect to candidates of a measuring environment of the next measurement that is different from the arbitrary measuring environment; a setting part configured to automatically set the measuring condition to be used to measure the running performance of the program using a measuring environment that is different from the arbitrary measuring environment, based on the information that is managed in the linkable manner; and a tuning part configured to tune the running performance of the program depending on the performance information. According to the performance tuning apparatus of the present invention, it is possible to improve the efficiently with which the performance of the program may be tuned.

Other objects and further features of the present invention will be apparent from the following detailed description when read in conjunction with the accompanying drawings.

BRIEF DESCRIPTION OF THE DRAWINGS

FIG. 10 is a diagram showing an example of a display screen that is displayed on the display part of the computer system when executing a step S7-3;

FIG. 14 is a diagram showing an example of a next measuring condition setting screen that is displayed when a step S23 is carried out for the first time;

FIG. 15 is a diagram for explaining information stored in a storage part when a measuring range and a next measuring condition are set;

FIG. 16 is a diagram showing a measured result that is displayed when a step S27 is carried out for the first time;

FIG. 18 is a diagram showing a measured result that is displayed when the step S27 is carried out the first time after conditions shown in FIG. 17 are set;

FIG. 19 is a diagram showing still another example of the next measuring condition setting screen; and FIG. 20 is a diagram showing a measured result that is displayed when the step S27 is carried out the first time.

DESCRIPTION OF THE PREFERRED EMBODIMENTS

Figure 1:
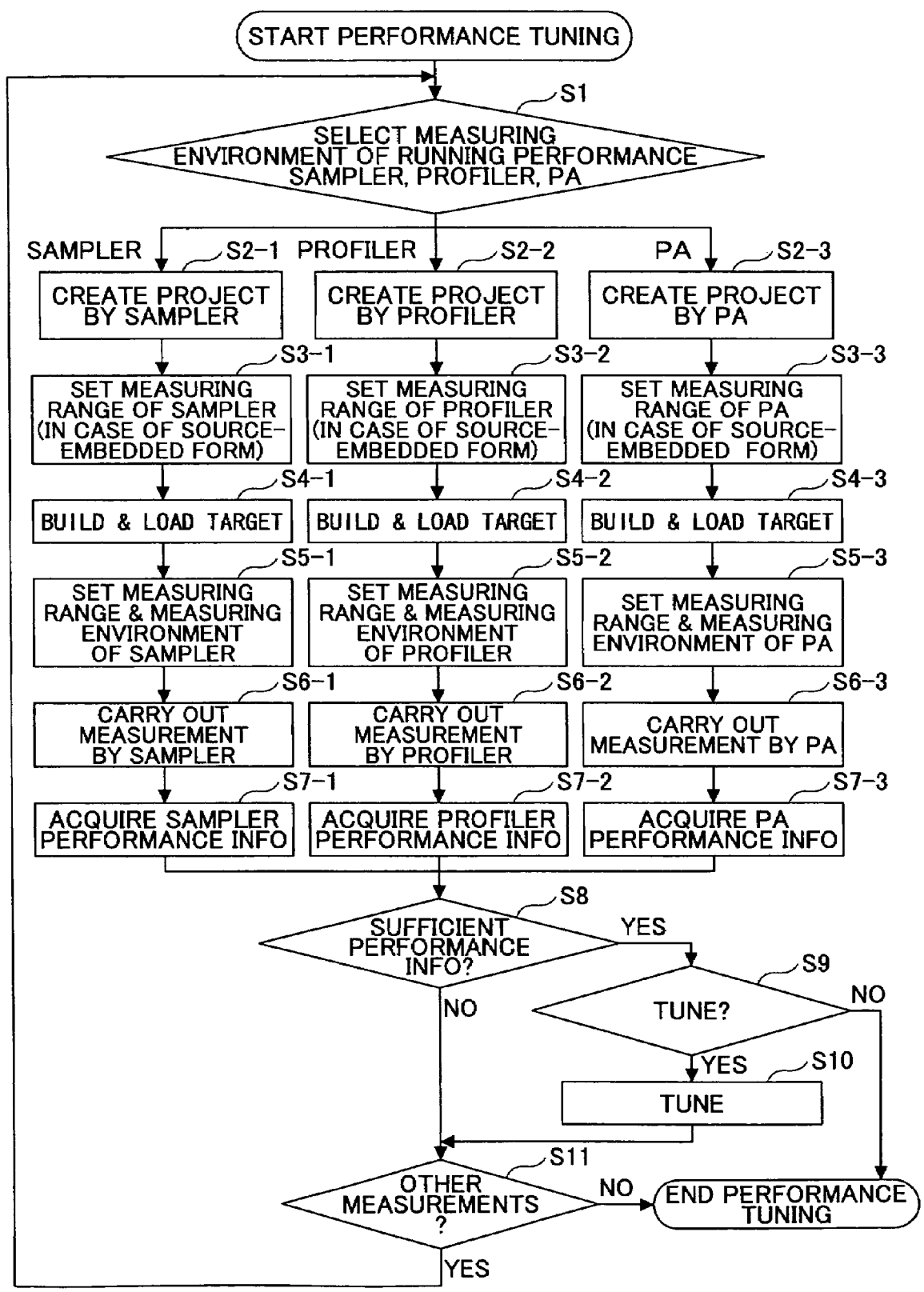
FIG. 1 is a flow chart for explaining an example of a conventional performance tuning method.

In the present invention, a measuring condition that is set when measuring a running performance of a program, and performance information that is acquired as a result of the measurement, are managed in a linkable manner with respect to candidates of different measuring environments (that is, different measuring methods). For this reason, the next time the running performance of the program is to be measured using a different measuring environment (that is a different measuring method) or, the measurement that narrows down the measuring range is to be repeated a plurality of times or, even if the measuring condition of the next measurement cannot be specified until the result of the previous measurement becomes definite, it is possible to automatically set the measuring condition of the next measurement.

For example, in the case of the integrated development environment (IDE), a sampler, a performance analyzer (PA) or a profiler is selected for a project control, compiling, assembling and linking are made by a build control, and the running performance of a target program is measured by an emulator control when the sampler or performance analyzer is selected so as to acquire performance information. This performance information is managed in a linkable manner with respect to candidates of the next measuring environment together with the measuring condition that is set at the time of the measurement. On the other hand, the running performance of the target program is measured by the emulator control when the profiler is selected so as to acquire performance information. This performance information is similarly managed in a linkable manner with respect to candidates of the next measuring environment together with the measuring condition that is set at the time of the measurement.

In other words, it becomes possible to share the measuring conditions and the performance information among different measuring environments (that is, different measuring methods).

Therefore, the operator does not need to carry out a troublesome operation of setting the measuring condition such as the measuring range every time the measuring environment (that is, measuring method) changes. In addition, even when the measuring environment (that is, measuring method) changes, it is possible to positively extract the candidate of the measuring environment without missing the tuning point. Hence, it is possible to carry out an efficient and effective tuning of the program.

A description will be given of embodiments of a performance tuning method, a performance tuning apparatus, a computer-readable program and a computer-readable storage medium according to the present invention, by referring to FIG. 11 and the subsequent drawings.

An embodiment of the performance tuning apparatus according to the present invention employs an embodiment of the performance tuning method according to the present invention, an embodiment of the computer-readable program according to the present invention and an embodiment of the computer-readable storage medium according to the present invention. In this embodiment, the present invention is applied to a computer system such as a personal computer (PC). FIG. 11 is a perspective view showing the computer system applied with the present invention.

Figure 11:
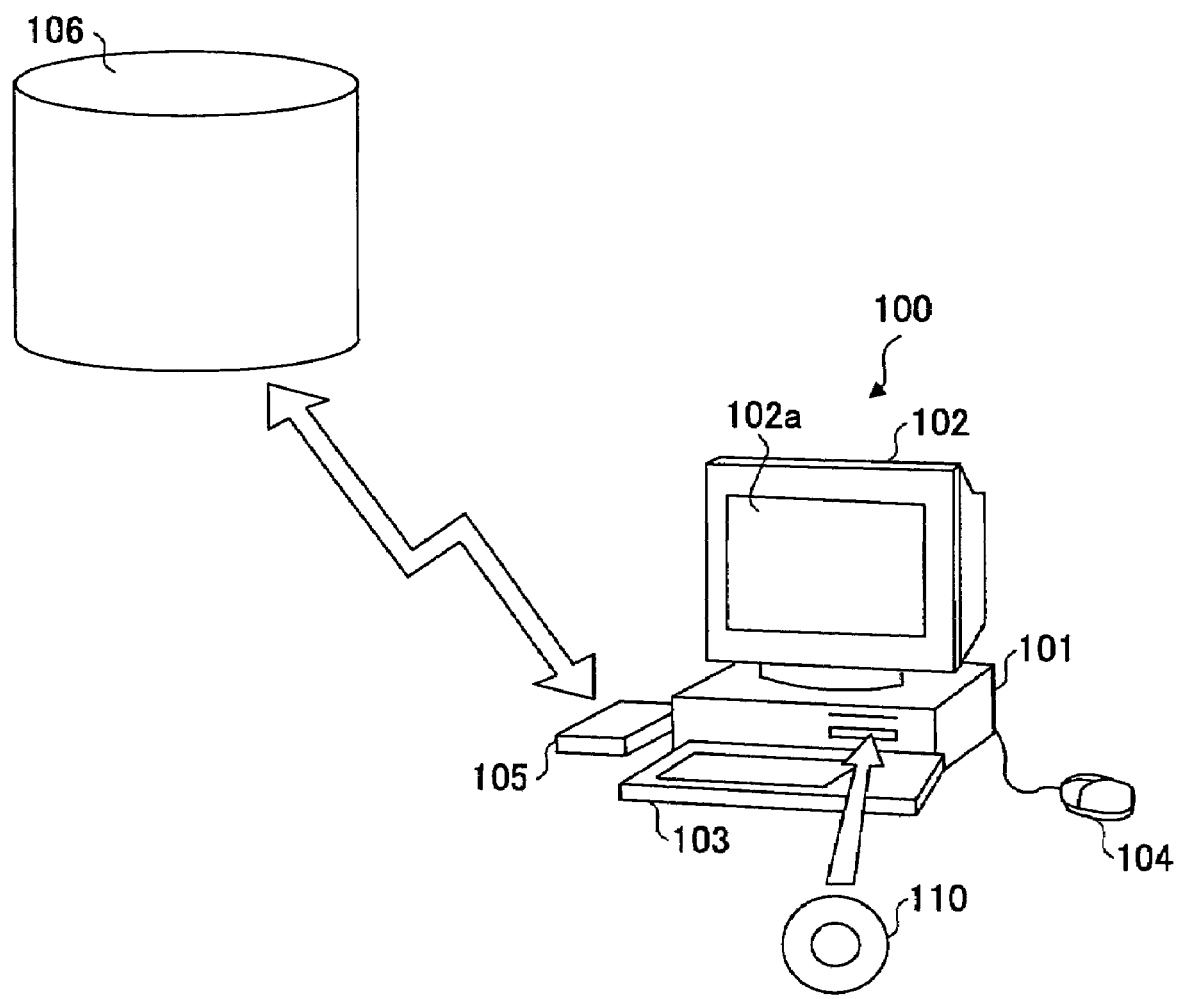
FIG. 11 is a perspective view showing a computer system applied with the present invention.

A computer system 100 shown in FIG. 11 has a main body part 101, a display 102, a keyboard 103, a mouse 104 and a modem 105. The main body part 101 includes a CPU, a disk drive and the like. The display 102 displays images on a display screen 102a in response to an instruction from the main body part 101. The keyboard 103 is used by a user to input various information to the computer system 100. The mouse 104 is used by the user to specify an arbitrary position on the display screen 102a of the display 102. The modem 105 makes access to an external database or the like and downloads programs and the like stored in another computer system. The display 102 forms a display part, and the keyboard 103 and/or the mouse 104 forms an input part.

The computer-readable program (performance tuning software) of this embodiment for making the computer system 100 have at least a performance tuning function, which is stored in a portable recording medium such as a disk 110 or, downloaded from a recording medium 106 of another computer system using a communication unit such as the modem 105, is input to the computer system 100 and compiled therein. The program of this embodiment operates the computer system 100 (that is, a CPU 201 which will be described later) as the performance tuning apparatus of this embodiment having the performance tuning function. The computer-readable storage medium of this embodiment is formed by a computer-readable recording medium, such as the disk 110, that stores the program of this embodiment. The recording medium forming the computer-readable storage medium of this embodiment is not limited to portable recording media such as the disk 110, IC card memories, magnetic disks including floppy (registered trademark) disks, magneto-optical disks and CD-ROMs. The recording medium forming the computer-readable storage medium of this embodiment includes various recording media accessible by the computer system that is connected via the communication unit or communication means such as the modem 105 and the LAN.

Figure 12:
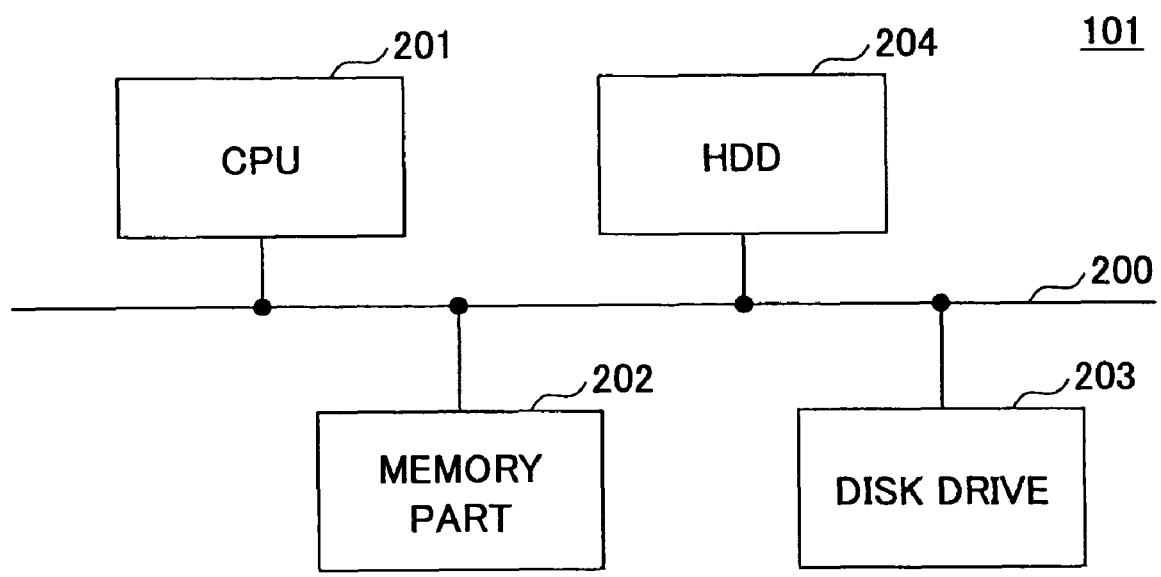
FIG. 12 is a system block diagram showing a structure of an important part within a main body part of the computer system.

FIG. 12 is a system block diagram showing an important part within the main body part 101 of the computer system 100 shown in FIG. 11. In FIG. 12, the main body part 101 includes a CPU 201, a memory part 202, a disk drive 203 and a hard disk drive 204 that are connected via a bus 200. The memory part 202 includes a RAM, a ROM and the like. The disk drive 203 is provided for the disk 110. In this embodiment, the display 102, the keyboard 103 and the mouse 104 are also connected to the CPU 201 via the bus 200, but it is of course possible to connect the display 102, the keyboard 103 and the mouse 104 directly to the CPU 201. In addition, the display 102 may be connected to the CPU 201 via a known graphic interface (not shown) that processes input and output image data. A storage part for storing programs and various data may be formed by at least one of the memory part 202, the disk drive 203, the HDD 204 and the recording medium 106 that is accessible from the computer system 100.

Of course, the structure of the computer system 100 is not limited to the structure shown in FIGS. 11 and 12, and other known structures may be used instead.

Figure 13:
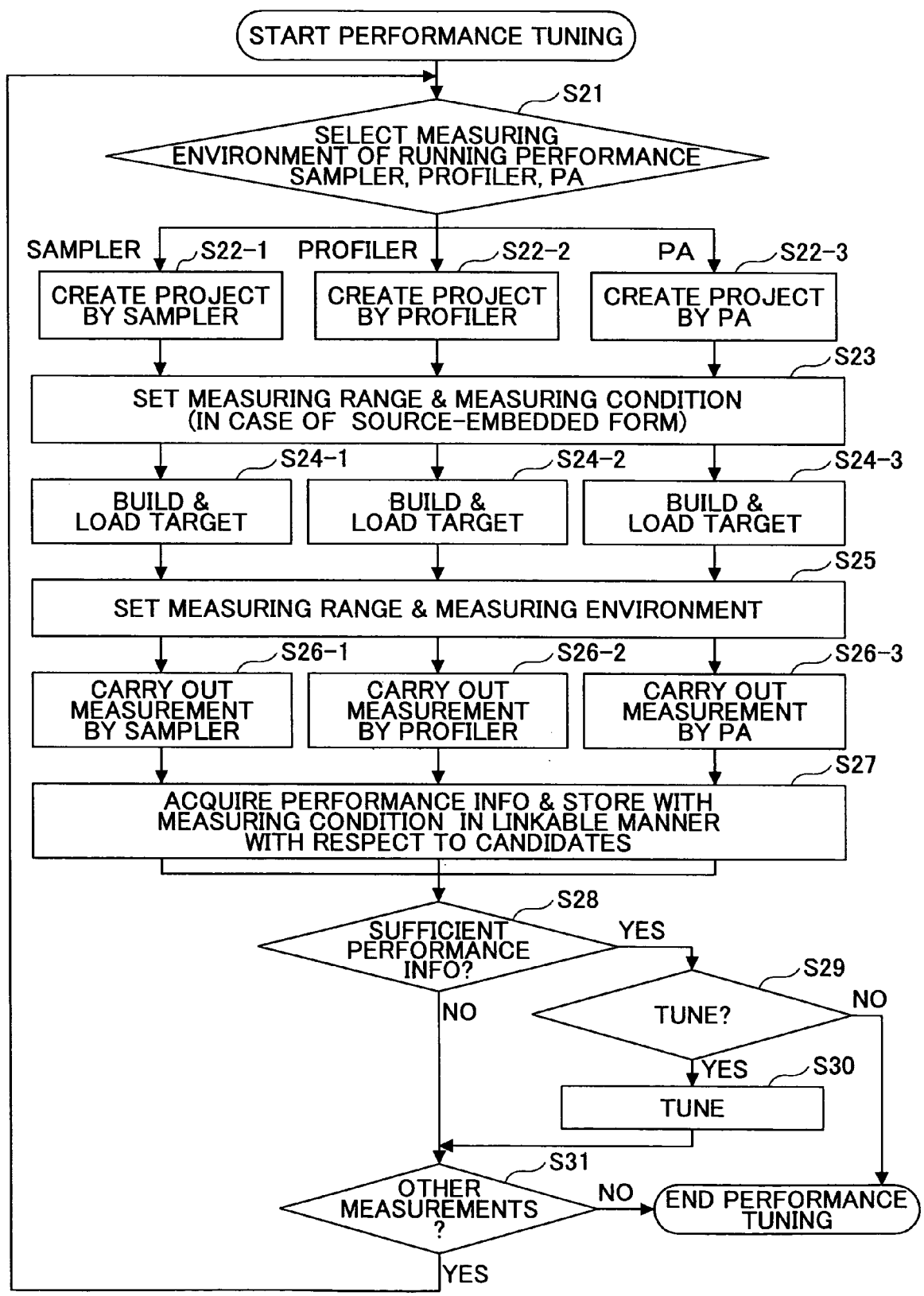
FIG. 13 is a flow chart for explaining an operation of an embodiment of the present invention.

FIG. 13 is a flow chart for explaining an operation of this embodiment of the present invention. Processes of steps S21 through S31 shown in FIG. 13 correspond to procedures of the program, and are executed by the CPU 201 with respect to the program (that is, target program) that is to be measured, that is, executed by corresponding means of the computer system 100. It is assumed for the sake of convenience that the sampler, the profiler and the performance analyzer, which use different methods of measuring the running performance of the program depending on the running environment of the program, are selectable as the measuring environment. The sampler, the profiler and the performance analyzer are tools for measuring the running performance of the program.

The step S21 selects a measuring environment on the display screen 102a for use in measuring the running performance of the target program, based on an instruction that is input by the operator from the input part. The process advances to the step S22-1 if the selected measuring environment is the sampler, advances to the step S22-2 if the selected measuring environment is the profiler, and advances to the step S22-3 if the selected measuring environment is the performance analyzer. Since the steps S22-2 through S27 and the steps S22-3 through S27 basically carry out processes similar to those of the steps S22-1 through S27, a description will be given of a case where the measuring environment that is selected first is the sampler and the measuring environment that is selected next is the performance analyzer.

The step S22-1 creates a project for measuring the running performance of the program, by the sampler. The step S23 first sets the measuring range of the sampler, that is, measurement control information indicating measurement start and end information, in a source-embedded form, and sets the next measuring condition, based on an instruction that is input by the operator from the input part. The next measuring condition includes information related to the measuring environment and the measuring target of the next measurement. The measuring range and the next measuring condition that are set in this manner are stored in the storage part. The step S24-1 builds and loads the measuring target. The step S25 is carried out if the step S23 is not carried out, and first sets the measuring range of the sampler, that is, the measurement control information, and sets the next measuring condition, based on an instruction that is input by the operator from the input part. The measuring range and the next measuring condition that are set in this manner are stored in the storage part. The step S26 carries out a measurement by the sampler using the set measuring range. The step S27 acquires performance information of the program obtained as a result of the measurement, and stores in the storage part the performance information together with the measuring condition that is set at the time of the measurement, in a linkable manner with respect to candidates of the next measuring environment. In other words, the performance information is managed in a linkable manner with respect to the candidates of the next measuring environment, together with the measuring condition that is set at the time of the measurement. In addition, the step S27 displays the performance information on the display screen 102a, and the process advances to a step S28.

The step S28 decides whether or not the acquired and displayed performance information indicates a desired performance or higher and is sufficiently high. The desired performance is set in advance. If the decision result in the step S28 is YES, a step S29 decides whether or not to tune the performance of the program, based on an instruction that is input by the operator from the input part. If the decision-result in the step S29 is YES, a step S30 tunes the program based on an instruction that is input by the operator from the input part. If the decision result in the step S28 is NO or, after the step S30, a step S31 decides whether or not to measure the running performance of the program under another measuring condition, based on an instruction that is input by the operator from the input part, and the process returns to the step S21 if the decision result in the step S31 is YES. If the decision result in the step S29 or S31 is NO, the process ends.

Since the performance analyzer is selected as the next measuring environment in this particular case, the step S23 or S25 sets the measuring range (that is, measurement control information) of the performance analyzer at the time of the next measurement, based on an instruction that is input by the operator from the input part, and also sets the next measuring condition if necessary. If it is assumed for the sake of convenience that no further measurements are made, the measuring range set in the step S23 or S25 is stored in the storage part. In addition, the step S27 acquires the performance information of the program that is obtained as a result of the measurement, and stores the acquired performance information in the storage part and also displays the acquired performance information on the display screen 102a.

Next, a description will be given of display screens that are displayed on the display 102 of the computer system 100 when the steps S22-1, S23, S25 and S27 shown in FIG. 13 are carried out at the time of the first measurement.

Figure 2:
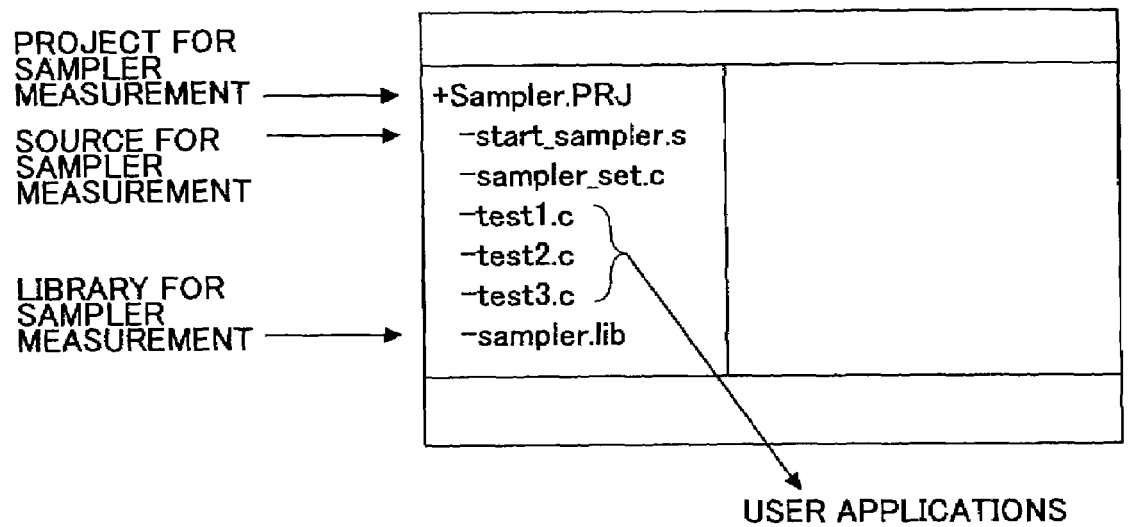
FIG. 2 is a diagram showing an example of a display screen that is displayed on a display part of a computer system when executing a step S2-1.

A project "+Sampler.PRJ" that is created in the step S22-1 is displayed as shown in FIG. 2, for example, and it is assumed for the sake of convenience that this project is registered within the integrated development environment (IDE). In the IDE, the sampler or performance analyzer or profiler is selected by a project control in the case described above, and the compiling, assembling and linking are carried out by a build control. Further, the running performance of the target program is measured and performance information of the running performance is acquired by an emulator control, when the performance analyzer or profiler is selected. This performance information, acquired when the performance analyzer or profiler is selected, is managed in a linkable manner with respect to candidates of the next measuring environment together with the measuring condition that is set at the time of the measurement. On the other hand, the running performance of the target program is measured and the performance information of the running performance is acquired by the emulator control, when the profiler is selected. This performance information, acquired when the profiler is selected, is similarly managed in a linkable manner with respect to the candidates of the next measuring environment together with the measuring condition that is set at the time of the measurement.

Figure 3:
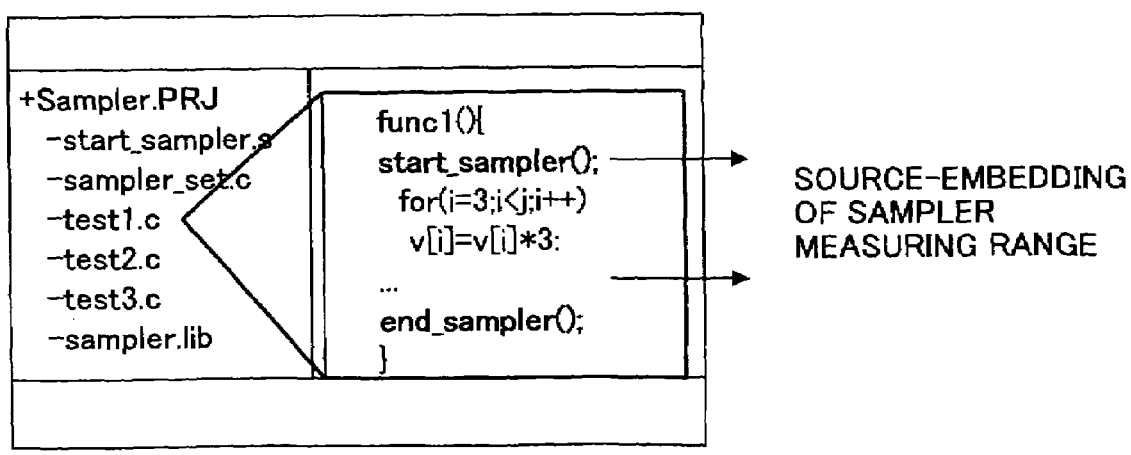
FIG. 3 is a diagram showing an example of a display screen that is displayed on the display part of the computer system when executing a step S3-1.

When the step S23 is carried out at the time of the first measurement, the measuring range of the sampler is set in the source-embedded form as shown in FIG. 3. In this state, a screen shown in FIG. 14 is displayed, so that information related to the measuring environment and the measuring target of the next measurement are set as the next measuring condition, based on an instruction that is input by the operator from the input part. FIG. 14 is a diagram showing an example of a next measuring condition setting screen that is displayed when the step S23 is carried out for the first time. FIG. 14 shows a case where the performance analyzer is set as the measuring environment of the next measurement, and a function having an occupied ratio of 80% or greater is set as the measuring target. Hence, in this case, information shown in FIG. 15 is stored in the storage part with respect to the next measuring condition. FIG. 15 is a diagram for explaining information stored in the storage part when the measuring range and the next measuring condition are set. In FIG. 15, the measurement control information "start" and "end" indicating the measurement start and end information, information "next" indicating whether or not the tool (measuring environment) is to be used for the next measurement, and information indicating that the function having the occupied ratio of 80% or greater is the measuring target of the performance analyzer which carries out the next measurement, are set as the measuring condition under which the next measurement is to be made, with respect to each selectable tool. In FIG. 15, if a symbol "O" appears in the field "next", this indicates that the corresponding tool is to be used for the next measurement. Because the measurement is first carried out by the sampler and the measurement is next carried out by the performance analyzer in this case, the measurement control information (measuring range) with respect to the sampler shown in FIG. 15 is first stored, and then, the corresponding measurement control information that is obtained by carrying out an appropriate conversion process if necessary is automatically stored with respect to the performance analyzer. If the measurement is first carried out by the sampler and the measurement is thereafter carried out by the profiler, the measurement control information with respect to the sampler is first stored, and then, the corresponding measurement control information that is obtained by carrying out an appropriate conversion process if necessary is automatically stored with respect to the profiler.

Figures 4, 5:
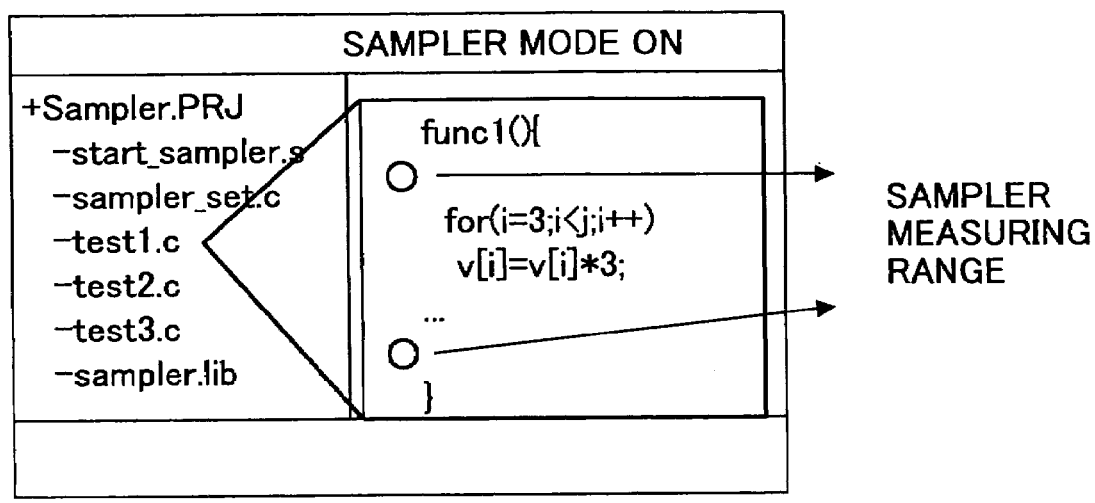
FIG. 4 is a diagram showing an example of a display screen that is displayed on the display part of the computer system when executing a step S5-1.
FIG. 5 is a diagram showing an example of a display screen that is displayed on the display part of the computer system when executing a step S7-1.

In a case where the step S25 is carried out at the time of the first measurement in place of the step S23, the measuring range of the sampler is set in the form other than the source-embedded form, as shown in FIG. 4. In this state, the screen shown in FIG. 14 is displayed, similarly to the case where the step S23 is carried out, so that information related to the measuring environment and the measuring target of the next measurement are set as the next measuring condition, based on an instruction that is input by the operator from the input part. Hence, with respect to the next measuring condition, the information shown in FIG. 15, for example, is stored in the storage part.

FIG. 16 is a diagram showing a measured result that is displayed when the step S27 is carried out for the first time. The measured result shown in FIG. 16 includes the performance information of the program, including the call number and the occupied ratio with respect to each function name, obtained by the first measurement, and the next measuring condition, including the measurement control information and the measuring target of the next measurement, obtained from the stored information shown in FIG. 15. The measurement control information includes measurement start and end information related to the start and end of the measurement carried out by the performance analyzer which carries out the next measurement. In addition, the measuring target indicates the measuring target of the performance analyzer which carries out the next measurement by a symbol "O", and indicates non-measuring targets to be excluded from the measurement by a symbol "X". The high-cost function may be specified from the performance information of the program shown in FIG. 16, and the measuring environment in which the running performance of the program is to be measured by the next measurement may be selected with respect to the high-cost function. In this particular case, the performance analyzer is selected as the measuring environment of the next measurement in the step S21, with respect to the high-cost function "func11( )" which has the highest occupied ratio. Accordingly, the measuring range of the performance analyzer that is to carry out the next measurement may be extracted from the measurement control information shown in FIG. 16 in which "_pa_start:" indicating the measurement start position of the performance analyzer is indicated as an insertion candidate in "test1.c line 12". The selection criteria, such as selecting the performance analyzer as the measuring environment of the next measurement with respect to the function having the highest occupied ratio, may be set in advance or, the selection may be dynamically by the operator. Therefore, the performance information of the program, obtained as a result of the measurement made in the step S27, is managed in a linkable manner with respect to the candidates of the next measuring environment, together with the next measuring condition that is set in the step S23 or S25.

Next, a description will be given of display screens that are displayed on the display 102 of the computer system 100 when executing the steps S22-3, S23, S25 and S27 shown in FIG. 13 at the time of the next measurement. It is assumed for the sake of convenience that, if the occupied ratio of the function is 80% or greater, the performance is the desired performance or higher and sufficient.

Figure 6:
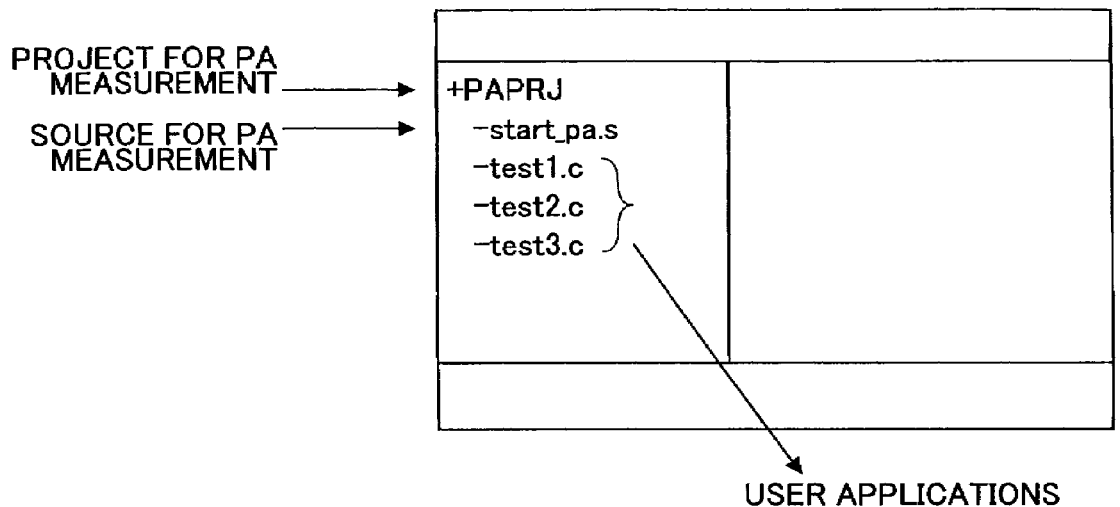
FIG. 6 is a diagram showing an example of a display screen that is displayed on the display part of the computer system when executing a step S2-3.
Figure 7:
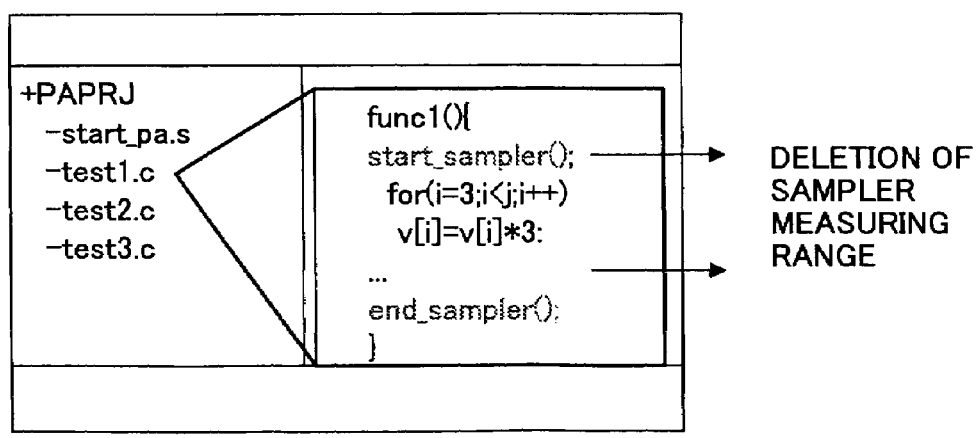
FIG. 7 is a diagram showing an example of a display screen that is displayed on the display part of the computer system when executing a step S3-3.
Figure 8:
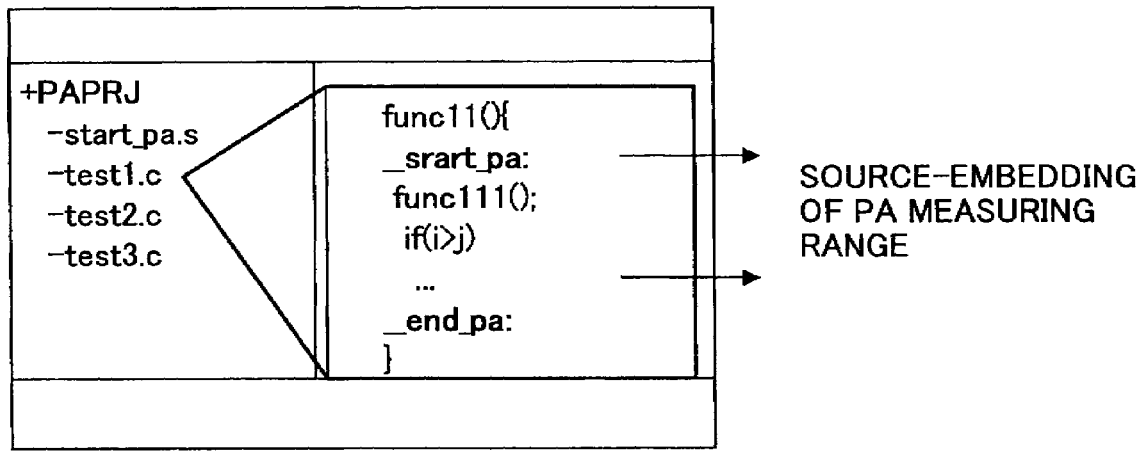
FIG. 8 is a diagram showing an example of a display screen that is displayed on the display part of the computer system when executing the step S3-3.
Figure 9:
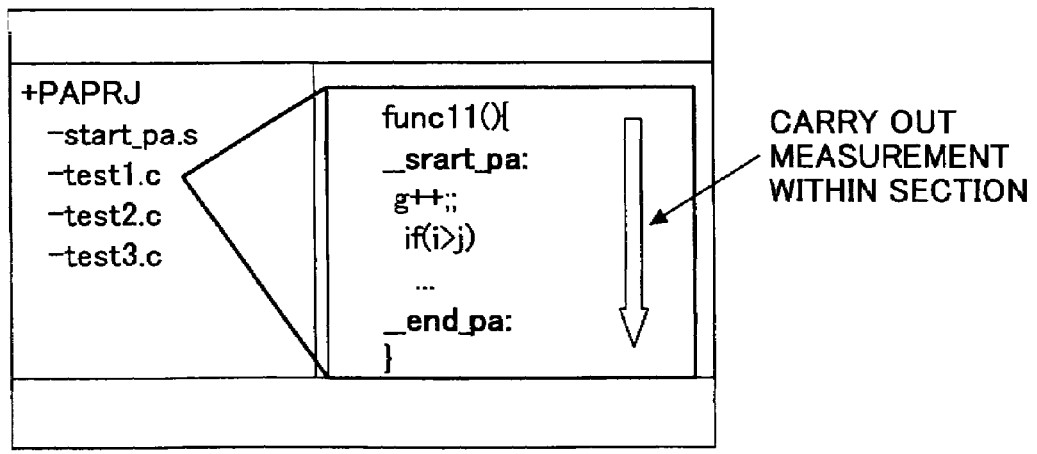
FIG. 9 is a diagram showing an example of a display screen that is displayed on the display part of the computer system when executing a step S5-3.

A project "+PA.PRJ" that is created in the step S22-3 at the time of the next measurement is displayed as shown in FIG. 6, for example. In the step S23 that is carried out at the time of the next measurement, the measuring range of the performance analyzer is set in the source-embedded form, but from the measurement control information that is extracted by the step S27 at the time of the first measurement, the exclusive function for carrying out the measurement by the performance analyzer is automatically embedded with respect to the high-cost function "func11( )". The measuring range of the performance analyzer can be set automatically in this manner, because the performance information of the program, obtained as a result of the measurement by the step S27 that is carried out at the time of the first measurement, is managed in a linked manner with respect to the candidates of the next measuring environment, together with the measuring condition of the next measurement set by the step S23 or S25 that is carried out at the time of the first measurement. As a result, it is possible to automatically set the measuring range of the performance analyzer as shown FIG. 8, for example.

In addition, in the step S25 that is carried out at the time of the next measurement because the step S23 is not carried out, the measuring range of the performance analyzer is set in the form other than the source-embedded form. In this case, the measuring range of the performance analyzer is automatically set from the measurement control information extracted by the step S27 that is carried out at the time of the first measurement. Consequently, it is possible to automatically set the measuring range of the performance analyzer as shown FIG. 8, for example.

As a result, in the step S27 that is carried out at the time of the next measurement, the performance information shown in FIG. 10, for example, is acquired and displayed. Thus, it is possible to easily and positively specify the performance index of the high-cost function "func11()" without requiring the operator to perform troublesome operations.

Accordingly, in the performance tuning method and apparatus that tune the running performance of the program, a managing function or means for managing the measuring condition that is set when the running performance of the program was measured under an arbitrary measuring environment and the performance information of the program acquired as a result of the measurement in a linkable manner with respect to the candidates of the measuring environment of the next measurement that is different from the arbitrary measuring environment, may be formed by the step S23 or the step S25 and the step S27 described above. In addition, a setting function or means for automatically setting the measuring condition to be used to measure the running performance of the program using a measuring environment that is different from the arbitrary measuring environment, based on the information that is managed in the linkable manner, may be formed by the step S23 or S25 described above. Moreover, a tuning function or means for tuning the running performance of the program depending on the performance information, may be formed by the steps S28 through S30 described above.

Figure 17:
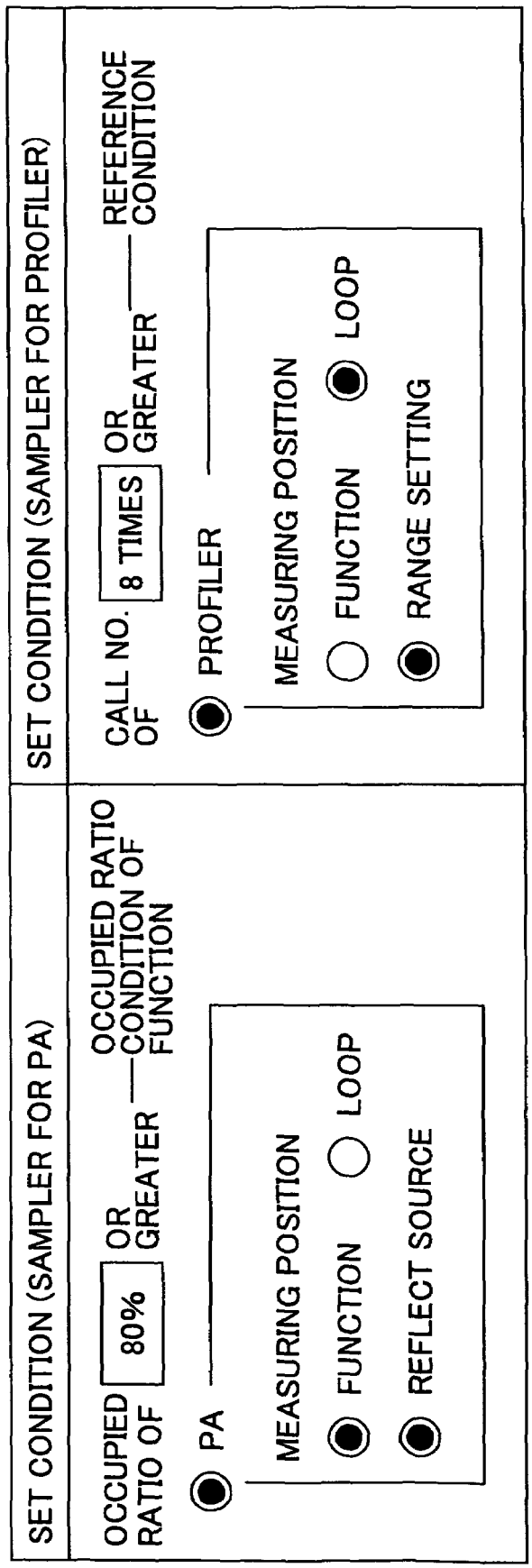
FIG. 17 is a diagram showing another example of the next measuring condition setting screen.

There are cases where, after carrying out the measurement by the sampler, the measurement is carried out by the performance analyzer or the profiler. In such cases, a screen shown in FIG. 17 may be displayed when carrying out the step S23 or S25 for the first time, so that the information related to the measuring environment and the measuring target of the next measurement is set as two kinds of measuring conditions for the next measurement, based on an instruction that is input by the operator from the input part. FIG. 17 is a diagram showing another example of the next measuring condition setting screen. In FIG. 17, the measuring condition for the next measurement to be carried out by the performance analyzer may be set on the left portion of the screen, while the measuring condition for the next measurement to be carried out by the profiler may be set on the right portion of the screen. FIG. 17 shows a case where the function having the occupied ratio of 80% or greater is set as the measuring target with respect to the performance analyzer in the left portion of the screen, with the "function" and "reflect source" selected as the measuring positions. On the other hand, FIG. 17 shows a case where the function having the call number (or number of references made) of 8 times or more as the measuring target with respect to the profiler in the right portion of the screen, with the "loop" and "range setting" selected as the measuring positions. The screen for setting the two kinds of measuring conditions does not need to simultaneously display the information in the right and left portions of the screen, and the information in the right and left portions of the screen may be displayed alternately, and using the entire display area of the screen if necessary. The setting "reflect source" automatically embeds the function having the occupied ratio of 80% or greater (that is, the function of the measuring range of the performance analyzer) within the source. The setting "range setting" validates the loop setting (that is, the measuring range of the profiler).

FIG. 18 is a diagram showing a measured result that is displayed when the step S27 is carried out the first time after the conditions shown in FIG. 17 are set. The measured result shown in FIG. 18 includes the performance information of the program including the call number and the occupied ratio with respect to each function name, the next measuring condition of the performance analyzer including the measurement control information and the measuring target for the next measurement by the performance analyzer, and the next measuring condition of the profiler including the measurement control information and the measuring target for the next measurement by the profiler. The measurement control information of the performance analyzer indicates the measurement start and end information related to the start and end of the measurement carried out by the performance analyzer which carries out the next measurement, as addresses of the section that is the target of the measurement, and the measuring target of the performance analyzer indicates whether or not the measuring target of the performance analyzer which carries out the next measurement is a "function". The measurement control information of the profiler indicates the measurement start and end information related to the start and end of the measurement carried out by the profiler which carries out the next measurement, and the measuring target of the profiler indicates whether or not the measuring target of the profiler which carries out the next measurement is a "loop". According to the performance information of the program shown in FIG. 18, it is possible to cope with a case where the next measurement is carried out using the performance analyzer and a case where the next measurement is carried out using the profiler. It is possible to specify the high-cost function also from the performance information of the program shown in FIG. 18, and the measuring environment in which the running performance of the program is to be measured by the next measurement may be selected with respect to the high-cost function.

In addition, the measuring range to be measured by the profiler after the measurement by the sampler may be directly connected to the tuning point. In such a case, when the step S23 or S25 is carried out at the time of the first measurement, a screen shown in FIG. 19 may be displayed, and the information related to the measuring environment and the measuring target of the next measurement may be set as the next measuring condition, based on an instruction that is input by the operator from the input part. FIG. 19 is a diagram showing still another example of the next measuring condition setting screen. FIG. 19 shows a case where the condition for the next measurement by the profiler is set such that, with respect to the profiler, the measuring target is set to a function having the call number (or number of references made) of 8 times or more, the "loop" and "range setting" are set as the measuring positions, and an optimizing insertion command "# pragma loop unroll" is set as the embedded description. The "range setting" is the setting to validate the setting of the loop (that is, measuring range of the profiler). The optimizing insertion command "# pragma loop unroll" is the setting to insert the optimizing command (# pragma loop unroll: development and optimization of for/white loop) at a high-frequency loop. By embedding the optimizing insertion command in the measuring condition, the automatic tuning of the program becomes possible as shown in FIG. 20. It is possible to judge whether the insertion line of the optimizing command is outside the function or inside the function based on the function definition of debug information that is normally included in the target when building the target in the step S22-1 (S22-2 or S22-3) shown in FIG. 13.

FIG. 20 is a diagram showing a measured result that is displayed when the step S27 is carried out the first time after the condition setting shown in FIG. 19. The measured result shown in FIG. 20 includes the performance information of the program including the call number and the occupied ratio with respect to each function name, the next measuring information of the performance analyzer including the measurement control information and the measuring target for the next measurement by the performance analyzer, the next measuring information of the profiler including the measurement control information and the measuring target for the next measurement by the profiler, and the optimizing insertion command. In other words, the measured result shown in FIG. 20 includes the optimizing insertion command in addition to the measured result shown in FIG. 18. According to the performance information of the program shown in FIG. 20, it is possible to cope with the case where the next measurement is carried out using the performance analyzer and the case where the next measurement is carried out using the profiler. It is possible to specify the high-cost function also from the performance information of the program shown in FIG. 20, and the measuring environment in which the running performance of the program is to be measured by the next measurement may be selected with respect to the high-cost function. Furthermore, it is possible to automatically tune the program.

The present invention also relates to a program developing method which uses the performance tuning method described above.

This application claims the benefit of a Japanese Patent Application No.2006-056632 filed Mar. 2, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. A performance tuning method, to be implemented in a computer, for tuning a running performance of a program, comprising:
   managing, by the computer, a measuring condition that is set at a time when the running performance of the program is measured under an arbitrary measuring environment and performance information of the program acquired as a result of the measurement, in a linkable manner within a storage part with respect to candidates of a measuring environment of a next measurement that is different from the arbitrary measuring environment;
   automatically setting, by the computer, the measuring condition to be used to measure the running performance of the program using a measuring environment that is different from the arbitrary measuring environment, based on the measuring condition and the performance information that are managed in the linkable manner within the storage part; and
   measuring, by the computer, performance information of the program using the measuring condition set by said automatically setting under the measuring environment that is different from the arbitrary measuring environment, in order to tune the running performance of the program depending on the performance information that is measured.

2. The performance tuning method as claimed in claim 1, wherein the measuring condition includes information related to the measuring environment in which the measurement is made and a measuring target of the measuring environment.

3. The performance tuning method as claimed in claim 1, wherein information managed in the linkable manner includes a measuring range that is set at the time of the measurement in the arbitrary measuring environment, and measuring information stored within the storage part and corresponding to the candidate of the measuring environment of the next measurement that is different from the arbitrary measuring environment.

4. The performance tuning method as claimed in claim 1, wherein different measuring environments include a measurement by an emulator and a measurement by a simulator.

5. The performance tuning method as claimed in claim 1, wherein said managing manages the measuring condition and the performance information in a linkable manner with respect to a plurality of next measuring environments.

6. A computer-readable storage medium that stores a performance tuning program which, when executed by a computer, causes the computer to perform a process to tune a running performance of a program, said process comprising:
   a managing procedure causing the computer to manage a measuring condition that is set at a time when the running performance of the program is measured under an arbitrary measuring environment and performance information of the program acquired as a result of the measurement, in a linkable manner within a storage part with respect to candidates of a measuring environment of a next measurement that is different from the arbitrary measuring environment;
   a setting procedure causing the computer to automatically set the measuring condition to be used to measure the running performance of the program using a measuring environment that is different from the arbitrary measuring environment, based on the measuring condition and the performance information that are managed in the linkable manner within the storage part; and
   a measuring procedure causing the computer to measure performance information of the program using the measuring condition set by the setting procedure under the measuring environment that is different from the arbitrary measuring environment, in order to tune the running performance of the program depending on the performance information that is measured.

7. The computer-readable storage medium as claimed in claim 6, wherein the measuring condition includes information related to the measuring environment in which the measurement is made and a measuring target of the measuring environment.

8. The computer-readable storage medium as claimed in claim 6, wherein information managed in the linkable manner includes a measuring range that is set at the time of the measurement in the arbitrary measuring environment, and measuring information stored within the storage part and corresponding to the candidate of the measuring environment of the next measurement that is different from the arbitrary measuring environment.

9. The computer-readable storage medium as claimed in claim 6, wherein different measuring environments include a measurement by an emulator and a measurement by a simulator.

10. The computer-readable storage medium as claimed in claim 6, wherein the managing procedure causes the computer to manage the measuring condition and the performance information in a linkable manner with respect to a plurality of next measuring environments.

11. A performance tuning apparatus for tuning a running performance of a program, comprising:
 a storage part; and
 a processor coupled to the storage part,
 wherein the processor comprises:
  a managing part configured to manage a measuring condition that is set at a time when the running performance of the program is measured under an arbitrary measuring environment and performance information of the program acquired as a result of the measurement, in a linkable manner within the storage part with respect to candidates of a measuring environment of a next measurement that is different from the arbitrary measuring environment;
  a setting part configured to automatically set the measuring condition to be used to measure the running performance of the program using a measuring environment that is different from the arbitrary measuring environment, based on the measuring condition and the performance information that are managed in the linkable manner within the storage part; and
  a measuring part configured to measure performance information of the program using the measuring condition set by the setting part under the measuring environment that is different from the arbitrary measuring environment, in order to tune the running performance of the program depending on the performance information that is measured.

12. The performance tuning apparatus as claimed in claim 11, wherein the measuring condition includes information related to the measuring environment in which the measurement is made and a measuring target of the measuring environment.

13. The performance tuning apparatus as claimed in claim 12, wherein information managed in the linkable manner includes a measuring range that is set at the time of the measurement in the arbitrary measuring environment, and measuring information within the storage part and corresponding to the candidate of the measuring environment of the next measurement that is different from the arbitrary measuring environment.

14. The performance tuning apparatus as claimed in claim 11, wherein different measuring environments include a measurement by an emulator and a measurement by a simulator.

15. The performance tuning apparatus as claimed in claim 11, wherein the managing part manages the measuring condition and the performance information in a linkable manner with respect to a plurality of next measuring environments.

* * * * *